United States Patent [19]

Stokes

[11] Patent Number: 5,570,503
[45] Date of Patent: Nov. 5, 1996

[54] METHOD FOR MAKING AN ELECTRIC MOTOR STATOR

[75] Inventor: Vijay K. Stokes, Schenectady, N.Y.

[73] Assignee: General Electric Company, Schenectady, N.Y.

[21] Appl. No.: 430,920

[22] Filed: Apr. 28, 1995

[51] Int. Cl.$^6$ .................................................. H02K 15/02
[52] U.S. Cl. ................... 29/596; 29/606; 29/609; 310/42; 310/218
[58] Field of Search ........................... 29/596, 598, 606, 29/609; 310/42, 43, 218, 154–156

[56] References Cited

U.S. PATENT DOCUMENTS

| | | | |
|---|---|---|---|
| 2,607,816 | 8/1952 | Ryder et al. ................ | 29/596 |
| 2,695,969 | 11/1954 | Yates ........................ | 29/596 |
| 3,365,795 | 1/1968 | Jensen ...................... | 29/596 |
| 3,787,744 | 1/1974 | Saito . | |
| 3,829,720 | 8/1974 | Swanke et al. . | |
| 3,914,859 | 10/1975 | Pierson ..................... | 29/596 |
| 4,149,309 | 4/1979 | Mitsui . | |
| 4,438,558 | 3/1984 | Mitsui ...................... | 29/596 X |
| 5,390,409 | 2/1995 | Courtney . | |

Primary Examiner—Carl E. Hall
Attorney, Agent, or Firm—Douglas E. Erickson; Marvin Snyder

[57] ABSTRACT

A method for making an electric motor stator. An annular disk is cut so as to create a radially-outer ring portion having slots and a radially-inner ring portion having spokes engaged with the slots. This step is repeated on additional disks. Then, the radially-outer ring portions are stacked together to form the stator outer shell, and the radially-inner ring portions are stacked together to form a multi-pole assembly with the aligned spokes forming the poles. Coils are wound around plastic sleeves which are each brought to, and placed over, a corresponding pole member. Then, the multi-pole assembly is positioned within the stator outer shell with the pole members engaging the aligned slots. Finally, the joined-together radially-inner ends of the spokes are cut to create narrow slits.

2 Claims, 4 Drawing Sheets

5,570,503

METHOD FOR MAKING AN ELECTRIC MOTOR STATOR

BACKGROUND OF THE INVENTION

The present invention relates generally to making electric motors, and more particularly to a method for making a low cost stator for an electric motor.

A conventional electric motor includes: a cylindrical metal stator; a metal rotor located radially within the stator and having two end shafts; and a metal housing which has bearings engaging the end shafts of the rotor and which surrounds and supports the metal stator. The stator for a conventional AC electric motor includes a stack of identical annular disks. Each disk is a monolithic steel piece which has been metal-punched to create a stamping. Each stamping includes a circumferentially-continuous ring portion having circumferentially spaced-apart and radially-inwardly projecting spokes with flared free-ends. The slot between circumferentially-adjacent spokes narrows to a slit at the spoke free-ends. Adjacently-stacked steel disks have their spokes aligned and their slots aligned. The stack of steel disks may be held together by bolts passing through holes in the ring portion of each disk. Each stack of aligned spokes defines a stator pole with each "stack" of aligned slots defining a longitudinally-extending groove. An insulated copper coil is wound around each stator pole. The electric motor stator includes the stacked disks and the wound coils. It is noted that each longitudinally-extending groove accommodates a portion of two coils since each groove is bounded by two stator poles. Complicated and expensive machinery is used to wind the coil for each stator pole since the stator poles are radially-inwardly projecting and since the longitudinally-extending groove separating circumferentially-adjacent poles narrows to a slit at the pole free-ends. What is needed is a less expensive method for making an electric motor stator.

SUMMARY OF THE INVENTION

It is an object of the invention to provide a method for making an electric motor stator.

The method of the invention is for making an electric motor stator and includes several steps. One step is cutting an annular disk so as to create a radially-outer ring portion with a radially-inward facing circumferential surface having a plurality of circumferentially spaced-apart, radially-inward facing slots and so as to create a radially-inner ring portion having a plurality of circumferentially spaced-apart, radially-outward projecting spokes with radially-outer ends engaged with the slots. Another step is separating the radially-inner and radially-outer ring portions by removing the spokes from the slots. The previous steps are repeated on a predetermined number of additional annular disks. Other steps are stacking together the radially-inner ring portions of the previous steps so as to create stacks of aligned spokes and stacking together the radially-outer ring portions of the previous steps so as to create stacks of aligned slots. An additional step is placing a coil around each stack of aligned spokes of the stacked-together radially-inner portions. After the previous step, another step is positioning the stacked-together radially-inner ring portions inside the stacked-together radially-outer ring portions such that the stacks of aligned spokes each engage a corresponding one of tile stacks of aligned slots.

In a first preferred method of the invention, before the step of placing the coil around each stack of aligned spokes, there is included the step of winding the coil around a plastic sleeve. Also, the step of placing the coil around each stack of aligned spokes includes placing the coil-wound plastic sleeve around the stack of aligned spokes of the stacked-together radially-inner ring portions.

Several benefits and advantages are derived from the invention. Having the stator pole members (i.e., the stacks of aligned spokes) be discrete from the stator outer shell (i.e., the stacked-together radially-outer ring portions) allows the coils to surround the pole members before the outer shell is attached to the pole members. This permits efficient, uniform packing of the coil windings in the space separating the pole members. Such added coil windings can be used either to increase the power of the electric motor or to decrease the size of the electric motor. One uniform coil winding technique employs the plastic sleeve of the first preferred method of the invention. Here, the coil surrounds the plastic sleeve which surrounds a pole member. This allows the coil to be wound around the plastic sleeve away from the pole member and then allows the coil-wound plastic sleeve to be brought to, and placed around, the pole member. It is noted that such "off-pole" winding of the coil allows inexpensive "bobbin-winding" techniques to be used in manufacturing the stator. It is further noted that conventional stators must use complicated and costly equipment to wind their coils around a radially-inward facing pole member and inside two radially-inward facing grooves having narrow openings, and that this does not result in well-packed coil windings, as can be appreciated by those skilled in the art.

BRIEF DESCRIPTION OF THE DRAWINGS

The accompanying drawings illustrate an electric motor stator and various components thereof made by a first preferred method of the present invention wherein.

DETAILED DESCRIPTION OF THE INVENTION

Figure 1:
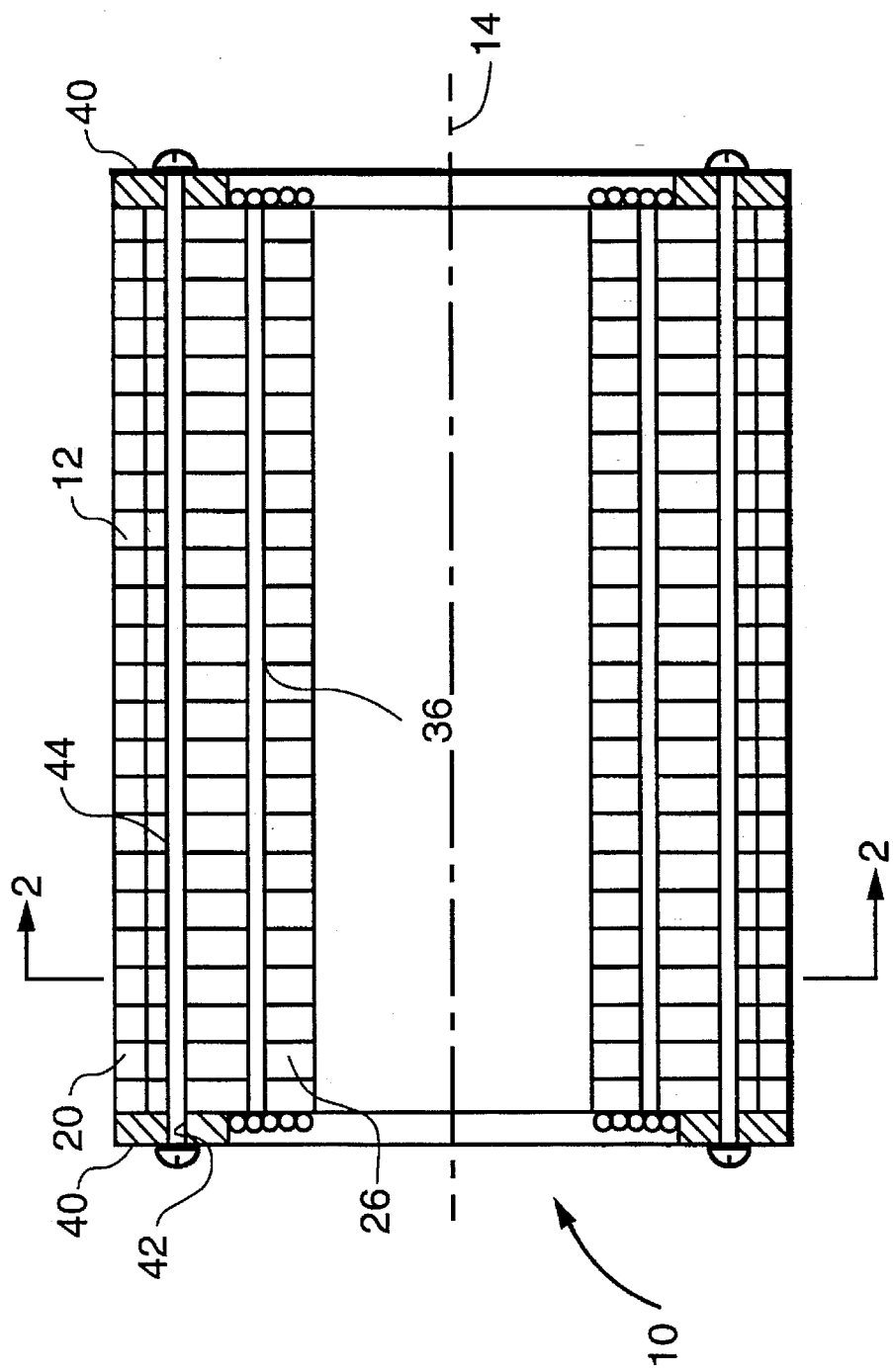
FIG. 1 is a schematic, cross-sectional, side-elevational view of an electric motor stator made by the first preferred method of the invention.
Figure 2:
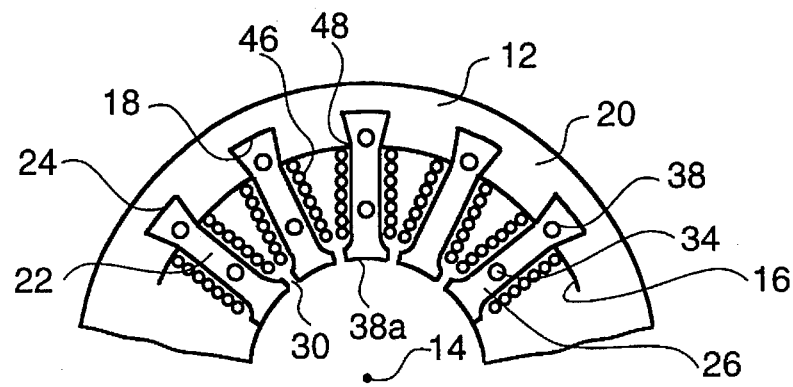
FIG. 2 is a schematic sectional view taken along lines 2—2 in FIG. 1 showing an embodiment wherein adjacent pole members have radially-inner ends spaced apart by a slit.

Referring now to the drawings, wherein like numerals represent like elements throughout, FIGS. 1 and 2 show an electric motor stator 10 made by a first preferred method of the present invention. The electric motor stator 10 can be for any type of electric motor such as, but not limited to, an AC motor, a DC motor, a constant speed motor, a variable speed motor, a reversible speed motor, etc. The electric motor stator 10 is ideally suited to be employed in electric motors used to power consumer goods such as, but not limited to, OTR (over-the-range) microwave oven fans, refrigerator pumps, clothes washers, vacuum cleaners, central air conditioners, etc.

The electric motor stator 10 includes a generally annularly-cylindrical outer shell 12. The outer shell 12 includes a generally longitudinally-extending axis 14 and a radially-inward facing surface 16 having a plurality of circumferentially spaced-apart, longitudinally-extending grooves 18. Preferably, the longitudinally-extending grooves 18 each have a generally-identical dovetail shape that increases in transverse width with increasing radial distance from the longitudinally-extending axis 14, as seen in FIG. 2. However, the longitudinally-extending grooves 18 may include other identical shapes or even different shapes. In an exemplary embodiment, the annularly-cylindrical outer shell 12 includes a stack of generally-identical laminate rings 20, as seen in FIGS. 1 and 2. Preferably, the laminate rings 20 each consist essentially of steel.

The electric motor stator 10 also includes a plurality of pole members 22 each discrete from the outer shell 12, each aligned along a radius from the longitudinal axis 14, and each having a radially-outer end 24 engaging a corresponding one of the plurality of longitudinally-extending grooves 18. Preferably, the radially-outer ends 24 of the pole members 22 each have a generally-identical dovetail shape that increases in transverse width with increasing radial distance from the longitudinally-extending axis 14, as seen in FIG. 2. Preferably, the shape of the dovetails of the radially-outer ends 24 of the pole members 22 is generally identical to the shape of the dovetails of the longitudinally-extending grooves 18. In an exemplary embodiment, the pole members 22 each include a stack of generally-identical plates 26, as seen in FIGS. 1 and 2. Preferably, the plates 26 each consist essentially of steel.

Figure 3:
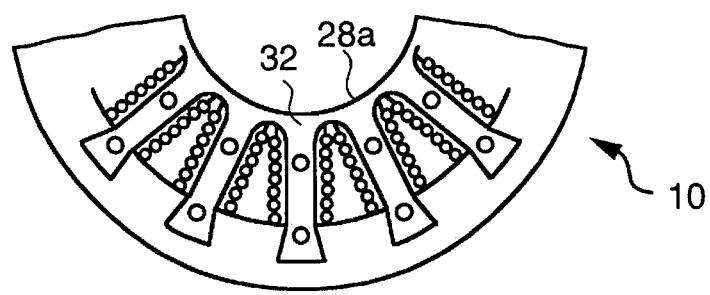
FIG. 3 shows a different embodiment of FIG. 2 wherein adjacent pole members have joined-together radially-inner ends.

In a first preferred construction, as seen in FIG. 2, circumferentially-adjacent pole members 22 each have radially-inner ends 28a circumferentially spaced apart to define a slit 30. Preferably, the slit 30 is a narrow slit, as can be appreciated by those skilled in the art. In a second and less preferred construction, which is shown in FIG. 3, the pole members 22 have joined-together radially-inner ends 28b and together define a monolithic multi-pole assembly 32. Here, the joined-together radially-inner ends 28b would be thinly joined together, as can be appreciated by those skilled in the art.

In an exemplary embodiment, when a laminate rotor construction is used, one of the pole members 22 has a longitudinally-extending first through hole 34. This means that each plate 26 in the stack of plates 26 defining that one pole member 22 has a first through hole 34. Preferably, the electric motor stator 10 includes a first bolt 36 engaging the first through hole 34 of that one pole member 22. In a favored construction, each pole member 22 has a first through hole 34 engaged by a corresponding first bolt 36.

Also, it is preferred, when a laminate rotor construction is used, that one (and preferably all) of the pole members 22 has a longitudinally-extending second through hole 38. This means that each plate 26 in the stack of plates 26 defining that one pole member 22 has a second through hole 38. It is further preferred that the electric motor stator 10 include a pair of end rings 40 longitudinally enclosing the annularly-cylindrical outer shell 12 with each end ring 40 having a hole 42. It is moreover preferred that the electric motor stator 10 include a second bolt 44 engaging the second through hole 38 of that one pole member 22 and the hole 42 of each of the end rings 40. In a favored construction, each pole member 22 has a second through hole 38 and each end ring 40 has holes 42 each aligned with a corresponding second through hole 38 and engaged by a corresponding second bolt 44.

Figure 7:
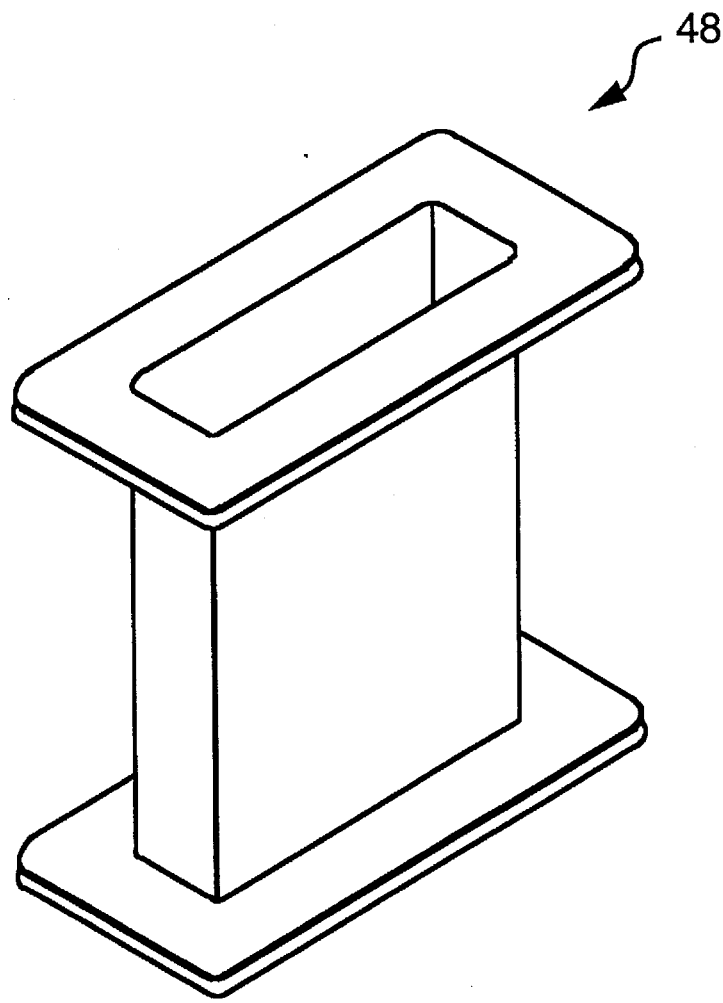
FIG. 7 is a schematic perspective view of a plastic sleeve of FIG. 2 which has been removed from its corresponding pole member and which is shown without its corresponding surrounding coil.

The electric motor stator 10 further includes a plurality of coils 46 each surrounding a corresponding one of the plurality of pole members 22 radially inward of the longitudinally-extending grooves 18. Preferably, each coil 46 is an insulated copper coil having a number of windings which surround a corresponding one of the pole members 22. In a first preferred embodiment, the electric motor stator 10 additionally includes a plurality of plastic sleeves 48, as seen in FIG. 2, with an enlarged view of a plastic sleeve 48 shown in FIG. 7. Each plastic sleeve 48 surrounds a corresponding one of the pole members 22, wherein the coils 46 each surround a corresponding one of the plastic sleeves 48. By the terminology "plastic sleeve" is meant a sleeve consisting essentially of plastic, such as, but not limited to, polypropylene. Preferably, each plastic sleeve 48 is a thin, generally-identical plastic sleeve.

The method of the invention is for making an electric motor stator 10, and the basic method includes steps a) through g).

Figure 4:
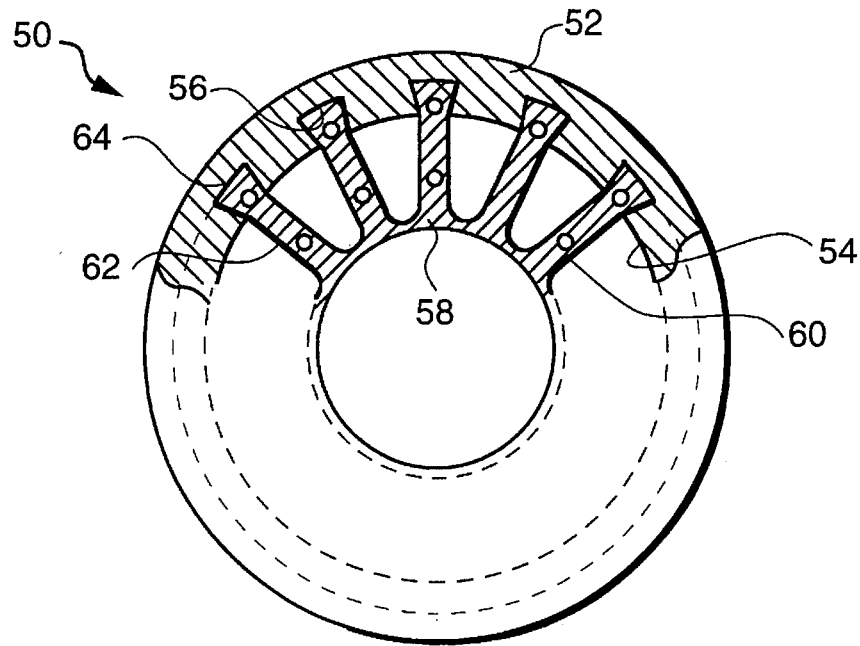
FIG. 4 is a schematic, cross-sectional, front view of an annular disk that has been cut by the first preferred method for making the stator of FIG. 1.

Step a), as seen in FIG. 4, includes the step of cutting an annular disk 50 so as to create a radially-outer ring portion 52 with a radially-inward facing circumferential surface 54 having a plurality of circumferentially spaced-apart, radially-inward facing slots 56 and so as to create a radially-inner ring portion 58 having a plurality of circumferentially spaced-apart, radially-outward projecting spokes 60 with radially-outer ends engaged with the slots 56. Preferably, the annular disk 50 comprises a metal disk, the cutting operation of step a) comprises metal-punching, and the radially-outer and radially-inner ring portions 52 and 58 comprise stampings. In an exemplary method, the radially-outer and radially-inner ring portions of step a) are punched in a single cutting operation which also creates first and second punched holes 62 and 64 in each spoke 60. In an exemplary method, the slots 56 cut in step a) each have a generally-identical dovetail shape, and the radially-outer ends of the spokes 60 created in step a) each have a shape generally matching the dovetail shape of the slots 56 cut in step a).

Figure 5:
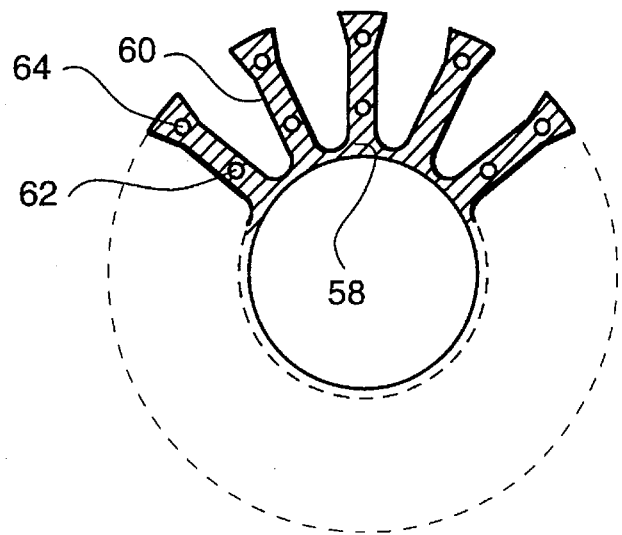
FIG. 5 is the radially-inner ring portion of the cut annular disk of FIG. 4 showing spokes.
Figure 6:
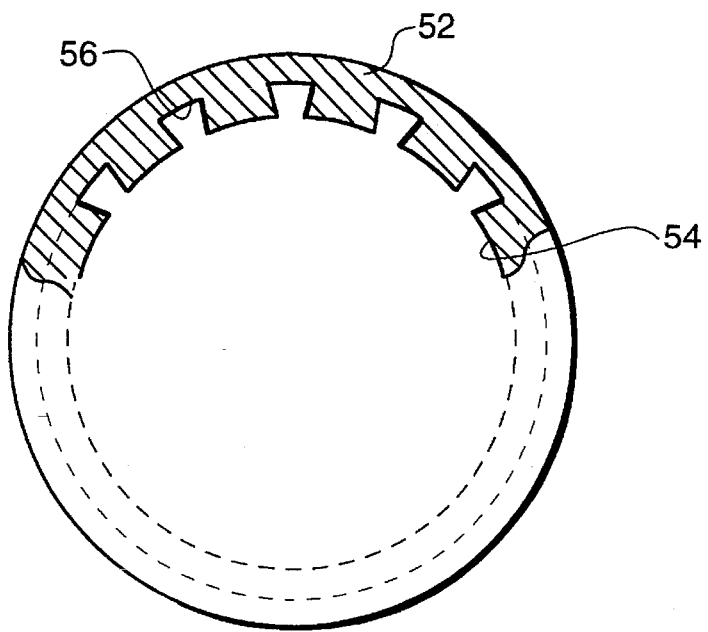
FIG. 6 is the radially-outer ring portion of the cut annular disk of FIG. 4 showing slots.

Step b), as seen in FIGS. 5 and 6, includes the step of separating the radially-inner and radially-outer ring portions 58 and 52 by removing the spokes 60 from the slots 56. Step c) includes the step of repeating steps a) and b) on a predetermined number of additional annular disks. Step d) includes the step of stacking together the radially-inner ring portions 58 of steps a) through c) so as to create stacks of aligned spokes 60, and step e) includes the step of stacking together the radially-outer ring portions 52 of steps a) through c) so as to create stacks of aligned slots 56. It is noted that the radially-outer ring portion 52 of FIG. 6 is the laminate ring 20 of FIGS. 1 and 2 and that the laminate rings 20 together form the annularly cylindrical outer shell 12 of the electric motor stator 10. It is further noted that the spokes 60 of FIG. 5 are the plates 26 of FIGS. 1 and 2 and that a stack of aligned plates 26 forms a pole member 22 with a stack of aligned first punched holes 62 defining the first through hole 34 and with a stack of aligned second punched holes 64 defining the second through hole 38. Preferably, at this time first bolts 36 are obtained and are disposed to engage the first through holes 34 to hold together the stacks of aligned spokes 60 so as to create a multi-pole assembly 32 having pole members 22.

Step f) includes the step of disposing a coil 46 around each stack of aligned spokes 60 of the stacked-together radially-inner ring portions 58 (as seen by the coils 46 surrounding the pole members 22 in FIG. 2). In the first preferred method of the invention, before step f), there is included the step of winding the coil 46 around a plastic sleeve 48 (as seen in FIG. 2, with the plastic sleeve 48 seen alone in FIG. 7). Here, step f) includes the step of disposing the coil-wound plastic sleeve around the stack of aligned spokes 60 of the stacked-together radially-inner ring portions 58. Preferably, the coil 46 comprises an insulated copper wire coil, and the winding step is performed with the spoke 60 free of the plastic sleeve 48. It is noted that the copper wire is bobbin-wound to form densely-packed coils around the plastic sleeves 48 and that the coil-wound sleeves (i.e., the coils 46 with their plastic sleeves 48) each are brought to, and are disposed around, a corresponding pole member 22 (as seen in FIG. 2).

Step g), which is performed after step f), includes the step of disposing the stacked-together radially-inner ring portions 58 inside the stacked-together radially-outer ring portions 52 such that the stacks of aligned spokes 60 each engage a corresponding one of the stacks of aligned slots 56. It is noted that the stacked-together radially-outer ring portions 52 of FIG. 6 create the previously-described, annularly-cylindrical outer shell 12 of FIG. 2 with the aligned slots 56 of FIG. 6 creating the previously-described, longitudinally-extending groove 18 of FIG. 2, as seen in FIGS. 1 and 2. Thus, in step g) the multi-pole assembly 32 (with the installed plastic sleeves 48 and coils 46) is disposed within the annularly-cylindrical outer shell 12 such that the radially-outer ends 24 of the pole members 22 engage the longitudinally-extending grooves 18 of the outer shell 12. Preferably, at this time a pair of end rings 40 each having holes 42 is obtained, and the end rings 40 are disposed to longitudinally enclose the annularly-cylindrical outer shell 12, with the holes 42 aligned with corresponding second through holes 38 of the pole members 22 (which are engaged in the grooves 18 of the outer shell 12). Second bolts 44 are obtained and are disposed to engage corresponding holes 42 and corresponding second through holes 38 for stronger attachment of the multi-pole assembly 32 to the outer shell 12.

After step g), a preferred additional step includes the step of cutting (such as by broaching) a slit 30 so as to circumferentially separate adjacent stacks of aligned spokes 60. Thus, the joined-together radially-inner ends 28b of the pole members 22 shown in FIG. 3 are cut to create the slits 30 between adjacent radially-inner ends 28a of the pole members shown in FIG. 2.

The foregoing description of several preferred methods of the invention has been presented for purposes of illustration. It is not intended to be exhaustive or to limit the invention to the precise methods disclosed, and obviously many modifications and variations are possible in light of the above teaching. For example, a method for making an electric generator stator is considered to be a method for making an electric motor stator since an electric generator can be operated as an electric motor. Also, instead of using first and second bolts 36 and 44 and end rings 40, other techniques may be employed to hold together the ring portions 52 and 58 including, but not limited to, rivets and other mechanical fasteners and brazing and other metallurgical fastening procedures, as is within the purview of the artisan. It is intended that the scope of the invention be defined by the claims appended hereto.

I claim:

1. A method for making an electric motor stator comprising the following steps:

a) cutting an annular disk in a single cutting operation so as to create:
1) a radially-outer ring portion with a radially-inward facing circumferential surface having a plurality of circumferentially spaced-apart, radially-inward facing slots; and
2) a radially-inner ring portion having a plurality of circumferentially spaced-apart, radially-outward projecting spokes with radially-outer ends engaged with said slots and with first and second through holes;

b) separating said radially-inner and radially-outer ring portions by removing said spokes from said slots;

c) repeating steps a) and b) on a predetermined number of additional annular disks;

d) stacking together said radially-inner ring portions of steps a) through c) so as to create stacks of aligned spokes;

e) stacking together said radially-outer ring portions of steps a) through c) so as to create stacks of aligned slots;

f) disposing a coil around each stack of aligned spokes of said stacked-together radially-inner ring portions;

g) after step f), disposing said stacked-together radially-inner ring portions inside said stacked-together radially-outer ring portions such that said stacks of aligned spokes each engage a corresponding one of said stacks of aligned slots;

h) creating a hole in each of a pair of end rings;

i) disposing said pair of end rings to longitudinally enclose said stacked together radially-outer ring portions;

j) securing first bolts in said first through holes of said spokes of said stacked-together radially-inner ring portions; and k) securing second bolts in said second through holes of said spokes of said stacked-together radially-inner ring portions and said holes of said pair of end rings.

2. The method of claim 1, also including, before step f), the step of winding said coil around a discrete plastic sleeve, and wherein step f) includes disposing said coil-wound sleeve around said stack of aligned spokes of said stacked-together radially-inner ring portions, and wherein said winding step is performed with said spoke free of said plastic sleeve.

\* \* \* \* \*